(12) United States Patent
Barenburg et al.

(10) Patent No.: US 8,890,868 B2
(45) Date of Patent: Nov. 18, 2014

(54) THREE DIMENSIONAL IMAGE DATA PROCESSING

(75) Inventors: Bart G. B. Barenburg, Waalre (NL); Bernardus A. M. Zwaans, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 179 days.

(21) Appl. No.: 13/119,269

(22) PCT Filed: Sep. 18, 2009

(86) PCT No.: PCT/IB2009/054088
§ 371 (c)(1),
(2), (4) Date: Mar. 16, 2011

(87) PCT Pub. No.: WO2010/035193
PCT Pub. Date: Apr. 1, 2010

(65) Prior Publication Data
US 2011/0169823 A1    Jul. 14, 2011

(30) Foreign Application Priority Data

Sep. 25, 2008  (EP) .................................... 08165060

(51) Int. Cl.
*G06T 15/40* (2011.01)
*G06T 15/20* (2011.01)

(52) U.S. Cl.
CPC .................................. *G06T 15/205* (2013.01)
USPC ......................................... 345/422; 345/419

(58) Field of Classification Search
USPC ................................................ 345/422, 419
See application file for complete search history.

(56) References Cited

U.S. PATENT DOCUMENTS

| | | | |
|---|---|---|---|
| 5,280,337 A | 1/1994 | DesJardins | |
| 6,249,616 B1 * | 6/2001 | Hashimoto | 382/284 |
| 6,266,068 B1 | 7/2001 | Kang | |
| 6,611,268 B1 * | 8/2003 | Szeliski et al. | 345/473 |
| 7,386,188 B2 * | 6/2008 | Peterson | 382/284 |

(Continued)

FOREIGN PATENT DOCUMENTS

| | | |
|---|---|---|
| CN | 101271583 A | 9/2008 |
| WO | WO2005027052 A1 | 3/2005 |

OTHER PUBLICATIONS

Zitnick C L et al: "High-quality video view interpolation using a layered representation" ACM Transactions on Graphics, ACM, US, vol. 23, No. 3, Aug. 8, 2004, pp. 600-608, XP002354522.

*Primary Examiner* — Maurice L McDowell, Jr.
(74) *Attorney, Agent, or Firm* — Larry Liberchuk

(57) ABSTRACT

An apparatus generates three dimensional image data. Specifically, image data for a first image layer and image data for a second image layer is generated together with depth indication data for at least one of the first image layer and the second image layer. The two image layers may be used e.g. for dependent images, such as foreground and background images, or for independent images, such as initial and final images for a cross fade. A dependency indicator which is indicative of a dependency between the image layers is generated and included in the three dimensional data. A rendering device may receive the three dimensional data and generate images for a three dimensional representation based on the data. The three dimensional processing is adapted in dependence on the dependency indicator. For example, interlayer de-occlusion processing may only be performed if the dependency indicator is indicative of dependent image layers.

20 Claims, 7 Drawing Sheets

(56) References Cited

U.S. PATENT DOCUMENTS

| | | |
|---|---|---|
| 2005/0285874 A1 | 12/2005 | Zitnick, III |
| 2007/0057944 A1* | 3/2007 | Redert .......................... 345/422 |
| 2007/0109409 A1* | 5/2007 | Yea et al. ...................... 348/153 |
| 2007/0124382 A1 | 5/2007 | Hughes |
| 2008/0007567 A1 | 1/2008 | Clatworthy |
| 2011/0242279 A1* | 10/2011 | Redert et al. .................... 348/43 |

* cited by examiner

THREE DIMENSIONAL IMAGE DATA PROCESSING

FIELD OF THE INVENTION

The invention relates to three dimensional image data including three dimensional video image data.

BACKGROUND OF THE INVENTION

Three dimensional displays add a third dimension to the viewing experience by providing a viewer's eyes with different views of the scene being watched. A popular approach for representing three dimensional (3D) images is to use one or more two dimensional (2D) images plus a depth representation providing information of the third dimension. Such an approach provides a number of advantages including allowing 3D views to be generated with relatively low complexity and providing an efficient data representation thereby reducing e.g. storage and communication resource requirements for 3D image (and video) signals. The approach also allows 2D images to be generated with different viewpoints and viewing angles than the 2D images that are included in the 3D image data. This can specifically be used to generate an additional image so that two images corresponding to a viewing angle of a viewers two eyes is provided. This may be used to provide 3D perception, i.e. to provide a 3D image.

A drawback of representing a 3D image by a single 2D image and associated depth information is that it does not include information about background image areas that are occluded by foreground objects. Accordingly, if the scene is rendered for a different viewpoint, no information can be revealed behind the foreground objects. Accordingly, it has been proposed to use multi-layer image and depth representations comprising a plurality of two dimensional images (e.g. a foreground image and a background image) with associated depth information. A description of how to render new views from such information can be found in Steven J. Gortler and Li-wei He, Rendering Layered Depth Images, Microsoft Technical Report MSTR-TR-97-09, and in for example United States Patent Application US20070057944.

In approaches using more than one layer, it has been proposed to allow layers to be semi-transparent. In the field of computer graphics, such an approach is for example described in Norman P. Jouppi and Chun-Fa Chang, "An Economical Hardware Technique for High-Quality Antialiasing and Transparency", Proceedings of Eurographics/Siggraph workshop on graphics hardware 1999. Such an approach allows semi-transparent materials to be visualised (e.g. water, smoke, flames) and also allows improved anti-aliasing of edges of objects at different depths. Specifically, it allows for a more gradual transition of edges. Thus, the transparency may not just be used for representing semi-transparent objects, but may also allow anti-aliasing of the edges of the foreground objects by making an edge semi-transparent such that a transparency value represents how much of a pixel should be foreground and how much of the background should visible. An example of such an approach can be found in: C. Lawrence Zitnick Sing Bing Kang Matthew Uyttendaele Simon Winder Richard Szeliski, "High-quality video view interpolation using a layered representation", in Proceedings of Siggraph 2004.

However, although such approaches may provide improved 3D image perception and images in many scenarios, they tend to have some disadvantages. In particular, the image quality and 3D perception may be suboptimal in some scenarios and the 3D processing may introduce distortions and image degradations, such as visible artefacts.

Hence, an improved approach for 3D image data processing would be advantageous and in particular an approach allowing increased flexibility, improved image quality, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of generating three dimensional image data comprising a plurality of image layers for use in rendering picture elements of views of a three dimensional image, the method comprising: providing (301) first image data for a first image layer; providing (303) second image data for a second image layer; providing (305) depth indication data for at least one of the first image layer and the second image layer; generating (307) a dependency indicator, the dependency indicator being indicative of whether a first image of the first image layer contains supplementary three dimensional layered image data for a second simultaneous image of the second image layer; and generating (309) the three dimensional image data comprising the first image data, the second image data, the depth indication data and the dependency indicator.

The invention may provide improved performance in many scenarios. In particular, an improved 3D perception and/or image quality may be achieved. In particular, a number of image artifacts and degradations associated with 3D image processing in some conditions may be reduced or eliminated. Rendering of image elements can refer to rendering of (sub) pixels of an image; the image being for example a full view of a three dimensional scene.

The dependency indicator may be indicative of whether simultaneous images of the first image layer and the second image layer comprise supplementary three dimensional layered image data for each other. Simultaneous image intended here is intended to refer to data intended for use in rendering image elements at one moment in time.

For example, supplementary image data may be data for one or more additional image planes representing a different depth. For example, a foreground image may provide supplementary 3D image data for a background image and vice versa.

In particular, the inventors have realized that layered 3D image formats may be used for different categories of images in the image layers and that degradations may occur from the 3D processing of these. The inventors have furthermore realized that improved performance can be achieved by adapting 3D processing in dependence on the nature of the image data being provided in the image layers, and specifically by adapting the 3D processing in response to the relationship between the image layers. Specifically, the inventors have realized that image degradations may occur when image layers are considered independent but are in fact dependent, or vice versa. The inventors have furthermore realized that the rendering of e.g. 3D images can be controlled by the originator/encoder/transmitter by including a dependency indicator in the three dimensional data.

For example, for a sequence of images, such as for a video sequence, the first and second image layer may comprise a foreground and background for the same scene. Thus, the image data of the layers may be combined to generate stereoscopic images (e.g. de-occlusion for foreground image objects may use image information from the background image). The image layers are accordingly dependent and inter-related and a rendering unit may consider both images together when generating the 3D image views. However, during a cross fade from one scene to another, the first image layer may comprise mixed foreground and background images of the original scene and the second image layer may comprise mixed foreground and background images of the subsequent scene. Gradually changing transparency values may then be used to perform a cross fade from the first to the second image layer. Following the cross fade the image layers may then revert to comprising separate foreground and background images. However, as realized by the inventors, such a sequence may well result in image degradations and artifacts during the cross fade since the 3D processing will attempt to perform de-occlusion based on images that are not foreground and background images of each other. As also realized by the inventors, this may be mitigated by the dependency indicator which can reflect that the image layers are dependent before and after but not during the cross fade. Accordingly, the 3D processing may be dynamically adapted to not perform interlayer 3D processing when the dependency indicator indicates that the image layers are not dependent.

The dependency indicator may indicate whether three dimensional interlayer processing of simultaneous images of the first image layer and the second image layer is feasible. The dependency indication may indicate whether simultaneous images of the first and second image provide supplementary representations at different depth levels for an image to be rendered. The dependency indicator may specifically be a combination indicator which indicates whether simultaneous images of the first image layer and the second image layer may be combined by a three dimensional process using interrelated three dimensional information from the layers.

Each of the image layers may comprise one or more images. For example, each image layer may comprise a sequence of images. The first and second image layers may comprise images that overlay each other.

In accordance with an optional feature of the invention, the dependency indicator is indicative of the first image layer and the second image layer being dependent when the first image layer is an occlusion layer for the second image.

This may allow an improved 3D image processing and may in particular reduce image artifacts and image quality degradation introduced by de-occlusion processing. A 3D rendering unit may specifically adapt 3D de-occlusion processing depending on the dependency indicator and may specifically use both the first and second image layers for de-occlusion processing if the dependency indicator is indicative of the first and second image layers being dependent, and to otherwise only use one of the layers.

In accordance with an optional feature of the invention, the dependency indicator is indicative of the first image layer and the second image layer being independent when the first image layer is not an occlusion layer for the second image.

This may allow a simplified and/or improved dependency indication and may in particular allow simplified operation in many embodiments. The dependency indicator may be a binary value reflecting whether the first image layer is an occlusion layer for the second image layer or not.

In accordance with an optional feature of the invention, the depth indication data comprises a first depth indication map for the first image layer and a second depth indication map for the second image layer; and wherein the dependency indicator is indicative of the first image layer and the second image layer being independent when depth indication values of the first depth indication map are inconsistent with depth indication values of the second depth indication map.

This may allow an improved 3D image processing and may in particular reduce image artifacts and image quality degradation introduced by 3D processing. In particular, the dependency indicator may provide an improved control for depth information in a 3D image processing system and may reduce or mitigate impact of processing inconsistent depth data.

In accordance with an optional feature of the invention, the depth indication values of the first depth indication map are inconsistent with the depth indication values of the second depth indication map if the depth indication values of the first depth indication map represent deeper depth levels than depth indication values of the second indication map in at least one image region and the depth indication values of the second depth indication map represent deeper depth levels than the depth indication values of the first indication map in at least one other image region.

This may allow an improved 3D image processing and may in particular reduce image artifacts and image quality degradation introduced by 3D processing. A deeper depth level for an image element or pixel may specifically be a depth indication value that represents image element further away with respect to a viewpoint corresponding to the view of the three dimensional image.

In accordance with an optional feature of the invention, the dependency indicator is indicative of the first image layer and the second image layer being independent when the first image layer and the second image layer comprises cross fade images, and is indicative of the first image layer and the second image layer being dependent when the first image layer and the second image layer do not comprise cross fade images.

The invention may allow a particular improved cross fade operation. In particular, the invention may reduce image degradation and artifacts when performing cross fades while still allowing high quality 3D processing when cross fades are not being performed.

A cross fade may include any transition from one image or image sequence to another image or image sequence. For example, a gradual transparency transition between the two images (or image sequences) may be used. As another example, the cross fade may be a wipe or other transition pattern.

In accordance with an optional feature of the invention, the dependency indicator is a binary data value having a first value indicating that the first image layer and the second image layer are dependent and a second value indicating that the first image layer and the second image layer are independent.

This may allow an efficient representation and a reduction of data overhead while allowing an efficient 3D processing control to reduce image degradation or artifacts caused by the 3D processing.

In accordance with an optional feature of the invention, the dependency indicator is set to the first value if the first image layer comprises a foreground image for an image of the second image layer and to the second value if the first image layer does not comprise a foreground image for the image of the second image layer.

This may allow an improved 3D image processing and may in particular allow high quality 3D processing based on foreground and background images while reducing image artifacts and image quality degradation when these are not available. The foreground image of the second image layer may specifically be a mixed image comprising both foreground image objects for the image of the second image layer as well as one or more image areas of the image of the second image layer.

In accordance with an optional feature of the invention, the first image layer belongs to a first image layer group and the second image layer belongs to a second image layer group, at least one of the first image layer group and the second image layer group comprising a plurality of image layers; and the dependency indicator is indicative of a dependency between image layers of the first image layer group and image layers of the second image layer group.

This may allow efficient operation, improved image quality and/or improved flexibility. In many embodiments, the approach may allow an efficient control of 3D processing while maintaining a low signaling overhead.

In accordance with an optional feature of the invention, image layers of an image layer group are dependent image layers.

This may allow efficient operation, improved image quality and/or improved flexibility. In particular, dividing image layers into groups of dependent image layers with the dependency between groups being variable and indicated by the dependency indicator may allow an efficient representation of the 3D image data and may reduce e.g. data rates.

In accordance with an optional feature of the invention, image data for image layers in an image layer group are adjacent and the dependency indicator is indicative of a location in the three dimensional image data of a next independent image layer group.

This may allow a particularly efficient representation for dependency information and may reduce the amount of overhead required for the dependency indicator.

In accordance with an optional feature of the invention, the method further comprises providing transparency data for at least one of the first image layer and the second image layer and including the transparency data in the three dimensional image data.

The combination of transparency information and dependency information may allow a particular efficient 3D procession approach. In particular, the combination may allow a number of efficient processing algorithms to be performed with improved performance and/or image quality. For example, improved cross fade operations can be achieved while maintaining facilitated control and low resource usage.

In accordance with another aspect of the invention, there is provided a method of rendering image elements comprising: receiving (501) three dimensional image data comprising first image data for a first image layer, second image data for a second image layer, depth indication data for at least one of the first image layer and the second image layer, and a dependency indicator indicative of a dependency between the first image layer and the second image layer; and rendering (503) image elements of multiple views of the three dimensional image data for use in visualizing a three dimensional image by processing the first image data, the second image data and the depth indication data in response to the dependency indicator.

The method may allow improved rendering of image elements for 3D representations. In particular, reduced image degradation or artifacts resulting from the 3D processing can be achieved. In particular, it may prevent image processing to be automatically adapted to the specific characteristics of the 3D image data. It will be appreciated that the features, comments and advantages previously described with reference to the method of generating 3D image data will equally apply to the method of rendering as appropriate.

In accordance with an optional feature of the invention, the rendering (503) comprises performing interlayer three dimensional image processing of simultaneous images of the first image layer and the second image layer only when the dependency indicator is indicative of the first image layer and the second image layer being dependent.

This may allow improved image quality in many applications and may in particular provide an efficient and high performance means of restricting the application of interlayer processing to conditions wherein this is likely to be advantageous.

In accordance with an optional feature of the invention, the rendering (503) comprises performing de-occlusion for a first image of the first image layer using information from a second image of the second image layer only if the dependency indicator is indicative of the first image layer and the second image layer being dependent.

This may allow improved image quality in many applications and may in particular provide an efficient and high performance means of adapting de-occlusion and 3D rendering algorithms to the specific (current) characteristics and usage of the image layers.

In accordance with an optional feature of the invention, the rendering (503) comprises combining a first image of the first image layer and a second image of the second image layer, the combination being in response to three dimensional image information when the dependency indicator is indicative of the first image layer and the second image layer being dependent and not being in response to three dimensional image information when the dependency indicator is indicative of the first image layer and the second image layer being independent.

The combination may specifically be in response to only transparency information when the image layers are independent. The individual first and second image may both be generated taking into account 3D information but the combination of these will in accordance with the optional feature not consider 3D information when combining the resulting images. The combination may specifically be by a linear combination of pixel values when the image layers are independent. The weighting of the first and second images may in this case be dependent on a transparency value for the pixel.

In accordance with another aspect of the invention, there is provided an apparatus for generating three dimensional image data comprising a plurality of image layers for use in rendering picture elements of views of a three dimensional image, the apparatus comprising: means (203) for providing first image data for a first image layer; means (205) for providing second image data for a second image layer; means (209, 211) for providing depth indication data for at least one of the first image layer and the second image layer; means (213) for generating a dependency indicator indicative of a dependency between the first image layer and the second image layer; and means (215) for generating the three dimensional image data comprising the first image data, the second image data, the depth indication data and the dependency indicator.

In accordance with another aspect of the invention, there is provided an apparatus for rendering image elements, the apparatus comprising: means (401) for receiving three dimensional image data comprising first image data for a first image layer, second image data for a second image layer, depth indication data for at least one of the first image layer and the second image layer, and a dependency indicator indicative of a dependency between the first image layer and the second image layer; and means (403) for rendering image elements of multiple views of the three dimensional image data for use in visualizing a three dimensional image by processing the first image data, the second image data and the depth indication data in response to the dependency indicator.

In accordance with another aspect of the invention, there is provided an image signal comprising: first image data for a first image layer; second image data for a second image layer; depth indication data for at least one of the first image layer and the second image layer; and a dependency indicator indicative of a dependency between the first image layer and the second image layer.

In accordance with another aspect of the invention, there is provided a method of generating three dimensional image data comprising a plurality of image layers for use in rendering picture elements of views of a three dimensional image, the method comprising: providing a first image layer comprising image data that at least for some images represents a composite image comprising a contribution from a plurality of images; providing a first depth layer comprising a composite depth map for the composite image; providing a second image layer comprising image data for a further image contributing to the composite image; providing a second depth layer comprising a further depth map for the further image; providing a transparency map representing a contribution of the further image to the composite image; generating a dependency indicator reflecting whether an image of the second image layer comprises at least one of a foreground image and a background image for at least one image contributing to a composite image of the first image layer or whether the image of the second image layer is not one of a foreground image and a background image of any image contributing to the composite image; and generating the three dimensional image data comprising the first image layer, the first depth layer, the second image layer, the second depth layer, the transparency map and the dependency indicator.

In accordance with another aspect of the invention, there is provided a method of rendering image elements comprising: receiving three dimensional image data comprising: a first image layer comprising image data that at least for some images represents a composite image comprising a contribution from a plurality of images; a first depth layer comprising a composite depth map for the composite image; a second image layer comprising image data for a further image contributing to the composite image; a second depth layer comprising a further depth map for the further image; a transparency map representing a contribution of the further image to the composite image; a dependency indicator reflecting whether an image of the second image layer comprises at least one of a foreground image and a background image for at least one image contributing to a composite image of the first image layer or whether the image of the second image layer is not one of a foreground image and a background image of any image contributing to the composite image; and rendering image elements of multiple views of the three dimensional image data for use in visualizing a three dimensional image by three dimensional processing of the three dimensional image data wherein de-occlusion for an image of the first image layer is in response to a simultaneous image of the second image layer only if the dependency indicator is indicative of the image of the second image layer being at least one of a background image and a foreground image of an image contributing to the image of the first image layer.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a representation of 3D image information that may be applied to one or more frames of a video signal. However, it will be appreciated that the invention is not limited to this application and may be applied to many other image types including for example still images, animations etc.

A popular format for representing 3D image data is to use a first image layer for image data for foreground images and a second image layer for image data for background images. In some scenarios, more than two layers may be used, e.g. a third layer may be used for images that are in between the background image and the foreground image. Furthermore, depth indication data is often included in the form of a depth indication map for the background image, the foreground image or typically for both the foreground and background images. In addition, it has been proposed to include transparency data which represents a degree of transparency for the image objects of the images. Typically, a foreground transparency layer is included that contains transparency information describing how transparent the foreground should be, i.e. the degree of which the background should be visible through the foreground.

Figure 1:
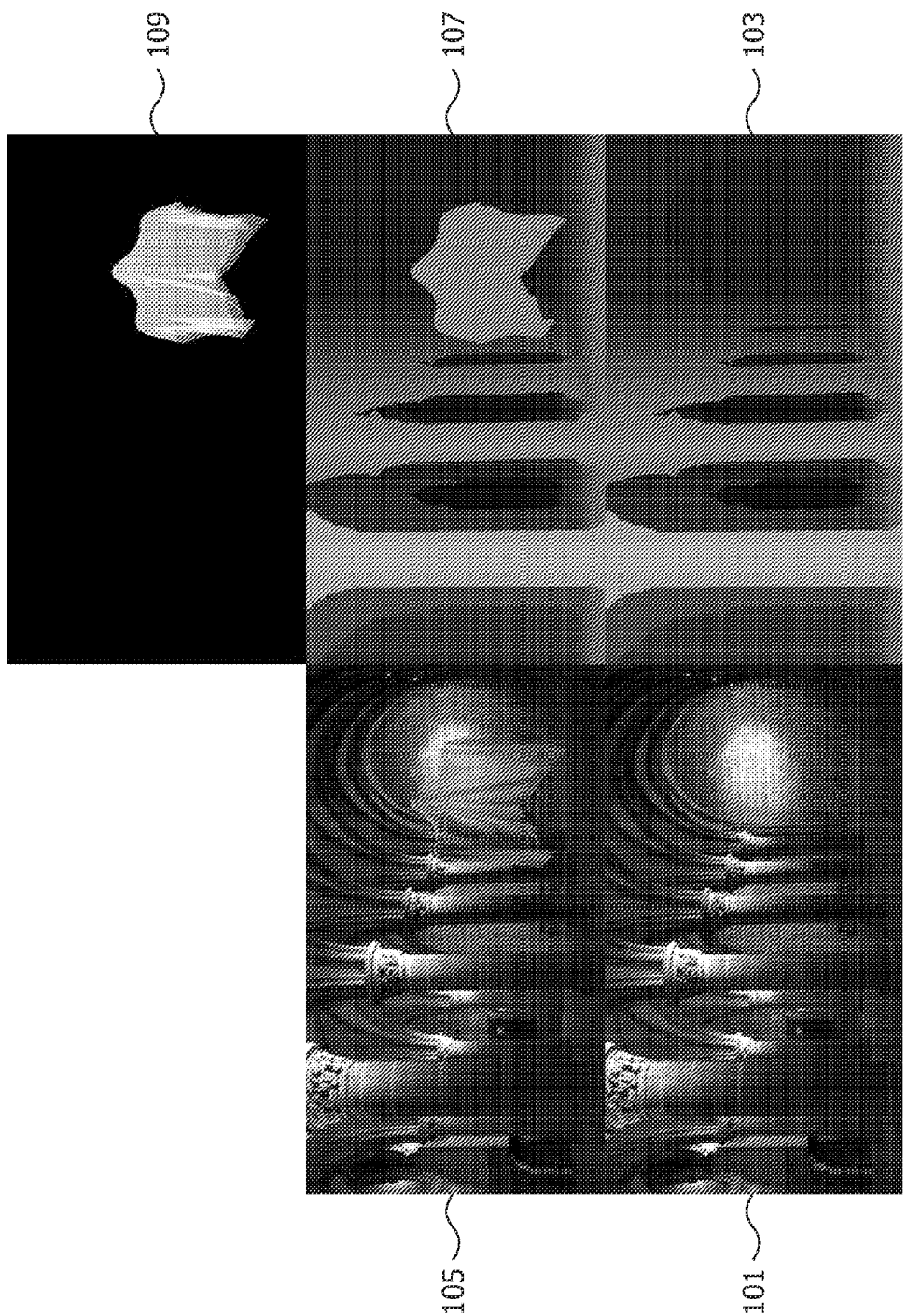
FIG. 1 is an illustration of examples of data for generation of images for three dimensional viewing.

FIG. 1 illustrates an example of 3D image data in accordance with such a format. FIG. 1 specifically illustrates a background image 101 which has an associated depth indication map 103 which for each pixel has a value indicative of a depth of the background image pixel. In the example, the 3D image data further comprises a foreground image 105 and an associated depth indication map 107. In the specific example, the foreground image 105 is actually a mixed image that comprises foreground image objects. However, for image areas where there are no foreground image objects, the background pixel values have been copied to the foreground image. Similarly, for these pixels, the background depth indication value has been copied to the foreground depth indication map 109. The use of a mixed image may provide improved backwards compatibility as it allows the mixed image to be directly presented as a conventional 2D image. However it will be appreciated that the following approach may apply equally to foreground images that contain only foreground image objects, i.e. to a conventional foreground image.

The 3D image data also comprises a transparency map 109 which for each pixel indicates a transparency of the foreground. Specifically, for pixel values that are part of a solid foreground image object, the transparency value may indicate full opacity (i.e. that only the foreground is visible). For pixel values that are completely outside any foreground image object, the transparency value may indicate full transparency (i.e. that the background is clearly and fully visible at this location). Furthermore, for semi-transparent foreground image objects, such as the ghost image object of the example, the transparency value may have an intermediate value indicating that both the foreground and background are partially visible. Intermediate transparency values may furthermore be applied around edges of foreground image objects in order to provide a smooth transition between the foreground and background. This may improve anti-aliasing performance.

The 3D image data may be used to perform three-dimensional image processing. In particular, the image data may be used to generate two views that correspond to different viewing angles. The two views may then be provided to the two eyes of a user resulting in a 3D perceptual viewing experience.

For example, an image for the left eye may be generated directly by combining the background and foreground image using the transparency values (or in the present case the mixed image may be used directly). A second image for the right eye can then be generated based on the three-dimensional information contained in the depth maps and the transparency map. Examples of such processing is e.g. provided in Steven J. Gortler and Li-wei He, Rendering Layered Depth Images, Microsoft Technical Report MSTR-TR-97-09, and in for example United States Patent Application US20070057944.

The processing to generate the second image can include displacing image objects corresponding to a determined parallax. Furthermore, the processing can include performing a de-occlusion for some foreground image objects. In particular, some background pixels that are not visible in the original view due to them being overlaid by foreground image objects may become visible at the different viewing angle. In such a case, the pixel values for the right eye image can be set to correspond to the pixel value for the appropriate background image pixel (which was previously occluded). This approach may result in a high image quality for the newly generated image.

However, in some situations, the available image layers may also be used to provide other visual effects. Specifically, a cross fade from one image to another (or for a video sequence from one sequence of images to another sequence of images) may be achieved by putting the original image in the first image layer and the new image in the second image layer. The transparency data can then be used to transition from the first image layer to the second image layer. This may provide a highly efficient cross fade which can be achieved with low complexity.

The inventors have realized that there are different use cases for 3D image data and transparency values. For example, transparency values may be used to create semi-transparent objects/edges in a scene or they may be used to create overlay effects between images that are completely independent, such as e.g. when performing a cross fade between two 3D images.

The inventors have furthermore realized that this may have significant consequences for the rendering of the images. Specifically, when the layers are related/dependent and comprise images that have a linked 3D significance (such as in the foreground/background example), interlayer 3D processing can be applied to improve the rendered image quality. Examples of such interlayer processing include filling in de-occlusion areas in the first layer with information from the second layer; copying background layer pixels to the foreground just before a de-occlusion etc. However, the inventors have realized that such interlayer processing will typically be detrimental when the two layers do not have a 3D relationship.

The inventors have furthermore realized that additional information can be included in the 3D image data to allow an originating/transmitting end to control the rendering processes performed by a rendering unit. Specifically, the inventors have realized that improved operation and performance can be achieved by including a dependency indicator which reflects the (current) dependency between the image layers. The dependency indicator indicates whether an image of one image layer contains supplementary 3D layered image data for a simultaneous image of another image layer. The supplementary 3D data for two images may specifically correspond to data reflecting data for image objects visible at that image plane.

This dependency indicator can for example indicate whether interlayer 3D processing can be applied or should not be applied when rendering the 3D image data. Thus, specifically, the dependency indicator may be used to signal whether layers of a multi-layer representation are inter-related or not, so that the proper processing can be switched on or off. As a specific example for a two layer representation, the dependency indicator may be a single bit signaling whether the two layers are in-dependent or related.

The dependency indicator may for example be generated by content creation tools and may e.g. be encoded as metadata in a suitable file format. For example, it may be inserted as an additional flag in a message header for data packets containing the 3D image data.

Figure 2:
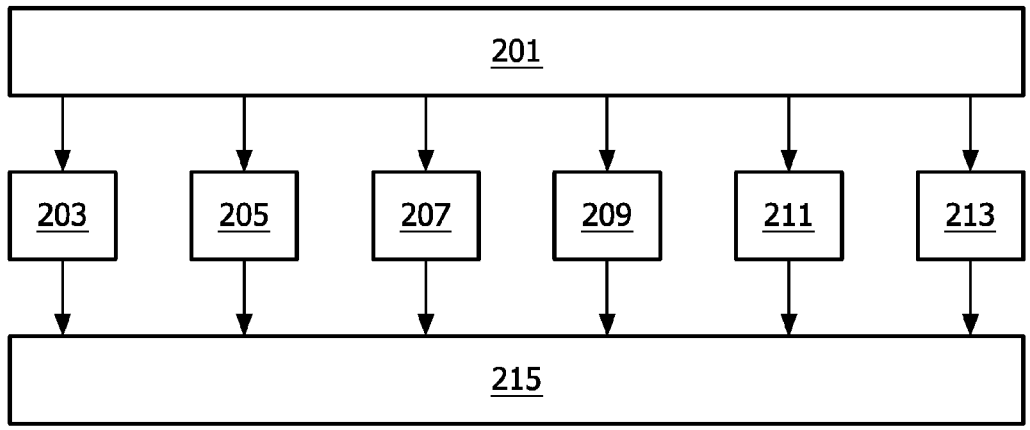
FIG. 2 illustrates an example of an apparatus for generating three dimensional image data in accordance with some embodiments of the invention.

FIG. 2 illustrates an example of an apparatus for generating three dimensional image data which comprises a plurality of image layers. The apparatus is specifically a signal encoder that encodes a three dimensional image signal comprising data corresponding to the example of FIG. 2.

The signal encoder comprises a content processor 201 which receives video signals corresponding to stereo-metric views (as e.g. originating from two separate video cameras). In response, the content processor 201 generates a sequence of foreground images and a sequence of background images.

The foreground images are fed to a first image layer processor 203 which proceeds to generate first image data for a first image layer. In the example, the first image layer processor 203 generally generates foreground image data for a first image layer such that the first image layer comprises a sequence of foreground images. However, during some transitional time intervals, the first image layer may be used for other types of images. Specifically, during a cross fade from one image sequence to another, the image data generated for the first image layer may be that of a combined foreground and background image. Thus, the first image layer may sometimes comprise a foreground image and may sometimes comprise a combined foreground and background image, i.e. a single layer image representation. It will be appreciated, that in embodiments where a mixed image is used for the foreground (as in the example of FIG. 1), the first image layer may always comprise a mixed image. However, in other embodiments, the first image layer processor 203 may be arranged to combine a received foreground and background image (only) during a cross fade transition.

The background images are fed to a second image layer processor 205 which proceeds to generate second image data for a second image layer. In the example, the second image layer processor 205 mostly generates background image data for the second image layer. However, during some transitional time intervals, the second image layer may be used for other types of images. Specifically, during a cross fade from one image sequence to another, the image data generated for the second image layer may be an image for the image sequence to which the cross fade is fading to. Thus, the second image layer may sometimes comprise a background image for the foreground image of the first image layer, and may sometimes comprise an image which is independent of the image of the first image layer.

Accordingly, in the example, the first image layer comprises foreground images and the second image layer comprises corresponding background images for most of the time. However, during cross fades, the first image layer will contain data for mixed images being combined foreground and background images for the image sequence prior to the cross fade. Similarly, the second image layer will contain data for mixed images being combined foreground and background images for the image sequence after the cross fade.

The signal encoder further comprises a transparency processor 207 coupled to the content processor 201 and being arranged to generate transparency data for at least one of the first image layer and the second image layer. Specifically, in the example, the transparency processor 207 generates a transparency map for the images in the first image layer. Thus, outside cross fades, the transparency map indicates the level of transparency of the foreground objects included in the foreground image of the first image layer. However, during simple cross fades the transparency map may comprise uniform transparency values for the entire image. Furthermore, the cross fade may be achieved by gradually changing the transparency value for the images from a value corresponding to full opacity for the first image layer to one corresponding to full transparency. Thus, a smooth transition and cross fade from the initial image sequence to be subsequent image sequences is achieved.

Accordingly, outside cross fades, the transparency data may be used to generate accurate 3D imaging, such as e.g. generating images according to different viewing angles). However, during a cross fade the transparency map is not suitable for 3D processing that rather is used to efficiently and easily achieve a desired cross fade. Thus, the transparency map may be used differently for different dependency scenarios.

The signal encoder also comprises a first depth map processor 209 coupled to the content processor 201 and arranged to generate a depth indication map for the images of the first image layer.

The depth indication map comprises depth indication values for pixels of the mixed image. The depth indication values may for example correspond to a numerical value that directly reflects an image depth for an image object to which the pixel belongs. However, it will be appreciated that in other embodiments, other depth indication values may be used. For example, the depth indication values may correspond to disparity or parallax values for the pixel.

Thus, in the example, the depth indication map comprises depth indication values for each pixel of the corresponding image of the first image layer. Thus, outside of a cross fade, the depth indication may be a depth indication for a foreground image. During a cross fade, the depth indication values may correspond to a mix of the depth indication values for the foreground and the background images as these are combined into mixed images. For example, for a mixed image, the depth indication value may be taken as the depth indication value of the foreground image except for pixels corresponding to full transparency. For these pixels, the depth indication value may be taken from the background image. In embodiments wherein a mixed image is used rather than a pure foreground image, the depth indication map may also represent mixed depth information outside the cross fade interval.

Specifically, the depth indication map may for example be generated as a map comprising a depth level, a depth value, a parallax value or a disparity value for each pixel of the background image. It will be appreciated that various approaches for generating a depth indication map for an image will be known to the skilled person. For example, the depth indication map may be generated from stereo images using semi-automated 2D to 3D conversion, or from computer graphics. Fully-automated depth generation from 2D video is also possible The signal encoder also comprises a second depth map processor 211 coupled to the content processor 201 and arranged to generate a depth indication map for the images of the second image layer. Thus, outside cross fades, the second depth map processor 211 generates depth information for background images and during a cross fade the second depth map processor 211 generates depth maps for mixed images of foreground and background images for the image sequence that follows the cross fade.

The signal encoder furthermore comprises a dependency processor 213 coupled to the content processor 201 and being arranged to provide an indication of the dependency between the images of the first image layer and the second image layer. For example, a simple binary value may be generated that reflects whether the images of the two image layers are part of a cross fade transition or not. Thus, the dependency indicator may be set to a first value when the image of the first image layer is a foreground image for the image of the second layer and set to a second value when the image of the first image layer is a mixed image of an image sequence prior to the cross fade and the image of the second image layer is a mixed image of an image sequence following the cross fade. Thus, the dependency indicator may be a simple binary flag indicating whether the images of the first image layer and the second image layer are dependent and inter-related or not.

The first image layer processor 203, the second image layer processor 205, the transparency processor 207, the first depth map processor 209, the second depth map processor 211, and the dependency processor 213 are coupled to a data combiner 215 which combines the image data for the first image layer, the image data for the second image layer, the transparency data, the depth indication map data for the first image layer, the depth indication map data for the second image layer, and the dependency indicator into a single stream of 3D image data.

Figure 3:
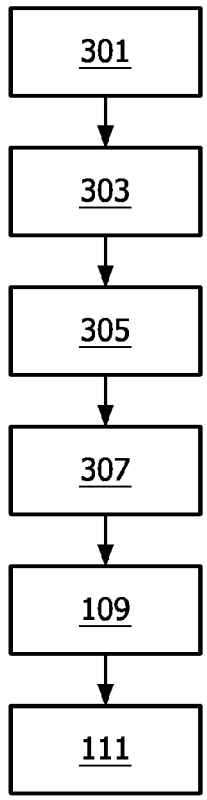
FIG. 3 illustrates an example of a method of generating three dimensional image data in accordance with some embodiments of the invention.

FIG. 3 illustrates an example of a method of generating 3D image data which may be performed by the signal encoder FIG. 2.

The method initiates in step 301 wherein the first image layer processor 203 generates image data for the first image layer as previously described.

Step 301 is followed by step 303 wherein the second image layer processor 205 generates image data for the second image layer as previously described.

Step 303 is followed by step 305 wherein depth indication data for at least one of the first image layer and the second image layer is generated by the first and/or second depth processors 209, 211. In the example, a depth indication map is generated for both the first and second image layer.

Step 305 is followed by step 307 wherein a dependency indicator which is indicative of a dependency between the first image layer and the second image layer is generated by the dependency processor 213.

Step 307 is followed by step 309 wherein the image layer data, the depth indication data and the dependency indicator are combined into the 3D data.

Figure 4:
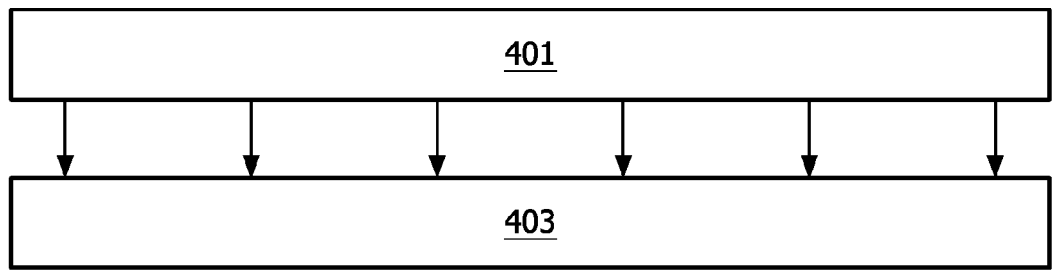
FIG. 4 illustrates an example of an apparatus for rendering image elements in accordance with some embodiments of the invention.

FIG. 4 illustrates and example of an apparatus for rendering image elements. The apparatus is specifically a rendering device which can receive the 3D image data generated by the signal encoder of FIG. 2 and generate two images for a 3D perception when separately viewed by the eyes of a viewer.

The apparatus comprises a receiver 401 which receives the data and separates it into the different data categories. Thus, the receiver 401 provides image data for the first image layer, image data for the second image layer, depth indication data for the first image layer, depth indication data for the second image layer, a transparency map and the dependency indicator.

The data is fed to a rendering unit 403 which receives the data and in response renders image elements corresponding to image elements of multiple views of the three dimensional image data for use in visualizing a three dimensional image. The rendering unit 403 specifically generates two images corresponding to respectively the left and right eye of a viewer. The images are generated by processing at least the image data of the first image layer, the image data of the second image layer and the depth indication data. In the example where transparency data is also included in the 3D data, the generation of at least one of the images (corresponding to a different viewing angle than that of the images of the first image layer and the second image layer) is also in response to the transparency data.

Furthermore, the processing is adapted to reflect whether the image layers are dependent or not. Thus, the rendering unit 403 is arranged to adapt the 3D processing in dependence on the dependency indicator. In the example, the rendering unit 403 may switch interlayer processing on or off dependent on whether the dependency indicator indicates that the image layers are dependent or not.

In the example, the rendering unit generates an offset viewing angle image (i.e. an image corresponding to a different viewing angle than that of the images of the first and second image layers) to provide a stereo-metric 3D image perception for a user.

In the specific example of a signal comprising cross fades, this image may be generated using the depth indication maps and the foreground and background images when no cross fade is performed. Thus, when the dependency indicator indicates that the first and second image layers are dependent and thus that the first image layer comprises a foreground image for the image of the second image layer, the generation of the offset viewing angle image is performed not only using the depth indication maps but also by performing interlayer processing using the foreground and background images.

Specifically, the generation of the offset viewing angle image includes de-occlusion processing. Thus, the offset viewing angle may displace some foreground objects such that pixels previously occluded by the foreground image objects will no longer be occluded. The rendering unit 401 may then use the appropriate values of the background image to fill in the de-occluded area. Thus, interlayer de-occlusion processing is used to generate a 3D image.

However, during a cross fade, the image of the second image layer is not a background image for the image of the first image layer. Accordingly, the interlayer de-occlusion will would result in completely unrelated pixel values being used to fill in de-occluded image regions. This may result in significant image degradation and the introduction of visible artefacts.

However, in the rendering device of FIG. 4, the de-occlusion processing is dependent on the dependency indicator. Specifically, the rendering unit 403 is arranged to only perform interlayer de-occlusion for corresponding (simultaneous) images of the two layers when the dependency indicator is indicative of the image layers being dependent. However, if the dependency indicator is indicative of the image layers being independent, i.e. in the specific example is indicative of a cross fade being performed, the rendering unit 403 proceeds to perform single layer de-occlusion for the concurrent images of the two image layers.

For example, the de-occluded pixel areas may be filled out using stored background data for the corresponding pixels. Specifically, the background pixel values from the last stored background image (i.e. the background image immediately prior to the dependency indicator switching from an indication of dependency to an indication of independence) may be used to fill in the de-occluded image area. This will provide an improved perceived image quality and will in particular reduce the perceived significance of artefacts introduced by the de-occlusion process.

Thus, in the example, the rendering performed by the rendering unit 403 combines the images of the first and second image layers when the dependency indicator indicates that the image layers are dependent. The combination can specifically include generating displacement information for the different viewing angle image based on the depth indication maps for both the first and second image layers, i.e. for both the foreground and the background image. The combination furthermore includes performing de-occlusion for the foreground image of the first image layer based on pixel values from the background image of the second image layer. Thus, the images are combined based on the 3D data that is contained in the received 3D data stream.

However, when the dependency indicator is indicative of the image layers being independent, the images of the first and second image layer may still be combined. For example, during a cross fade, the rendered image may include contributions from both the image of the first image layer and the image of the second image layer. However, in this case, the combination is only based on the transparency values for the image of the first layer. Thus, whereas the individual image of the first and second image layers may be rendered taking into account e.g. the depth map and using single layer de-occlusion, the combination of the two images does not take into account any of the 3D information.

Figure 5:
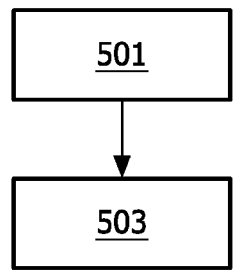
FIG. 5 illustrates an example of a method of rendering image elements in accordance with some embodiments of the invention.

FIG. 5 illustrates an example of a method of rendering image elements which may be performed by the rendering device of FIG. 4.

The method starts in step 501 wherein the receiver 401 receives the 3D image data comprising image data for the first image layer, image data for the second image layer, depth indication data for the first image layer, depth indication data for the second image layer, a transparency map and the dependency indicator.

This data is then fed to the rendering unit 403 which in step 503 proceeds to render image elements corresponding to image elements of multiple views of the 3D image data for use in visualizing a three dimensional image by processing the data received from the receiver 401.

Figure 6:
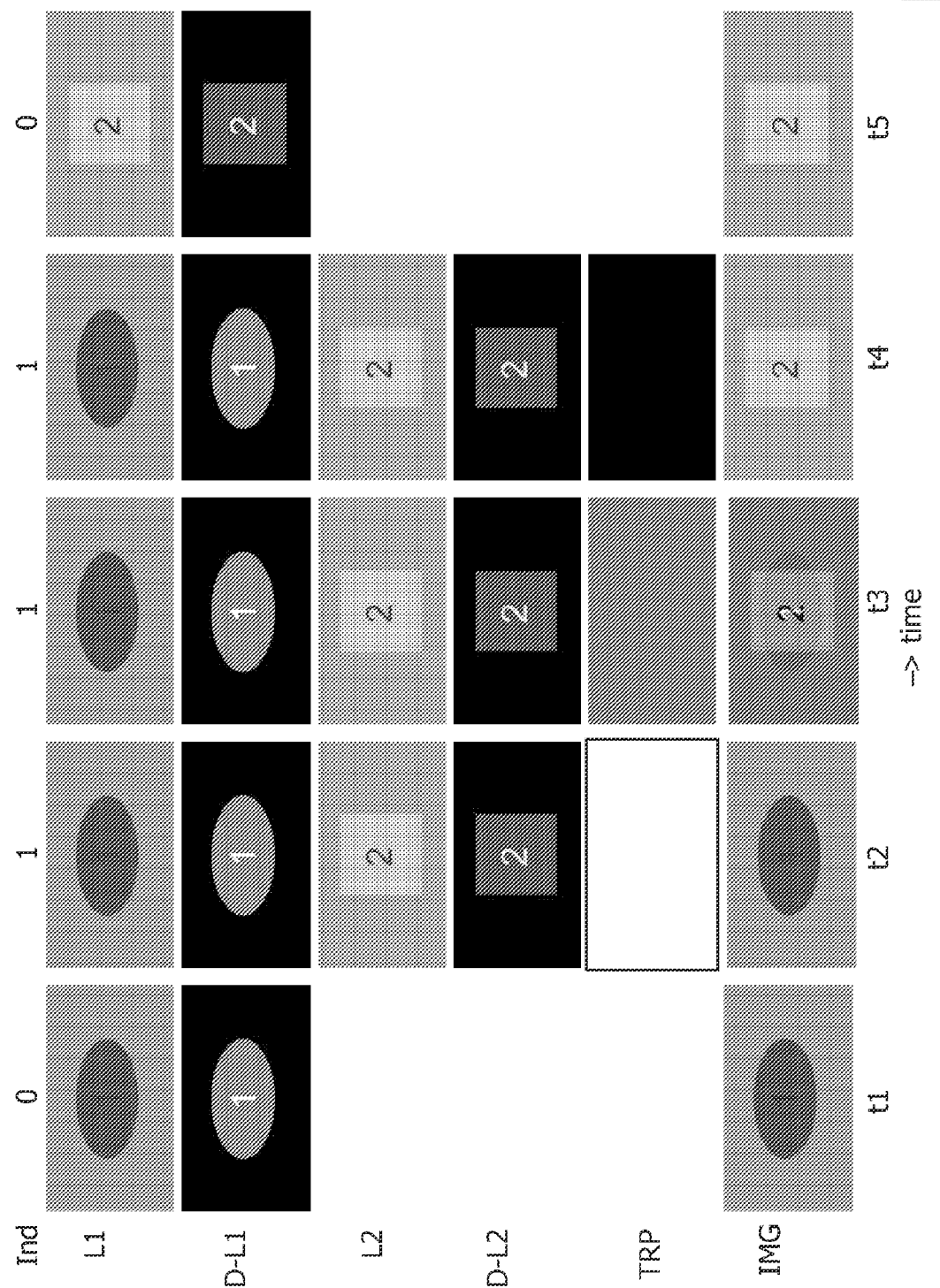
FIG. 6 illustrates an example of a cross fade in accordance with some embodiments of the invention.

FIG. 6 illustrates a specific example of the processing performed by the system comprising the encoder of FIG. 2 and the rendering device of FIG. 4 during a cross fade. FIG. 4 specifically illustrates the value of the dependency indicator (Ind) which is set to 0 to reflect a dependency between the first and second image layers and to 1 to reflect independence of the first and second image layers. It furthermore illustrates the contents of the first image layer L1, the depth indication map for the first image layer D-L1, the second image layer L2, the depth indication map for the second image layer D-L2, the transparency map TRP and the rendered image for different times (IMG). It will be appreciated that in other embodiments, the row (IMG) may correspond to a mixed image which is generated at the encoder and transmitted to suitable rendering units.

Thus in the example, a signal stream may be transmitter which contains first layers, namely a first and second image layer (L1,L2) a first and second depth layer (D-L1, D-L2) and a first transparency layer (TRP). In some situations, the first and second image layers (L1, L2) contain dependent and supplementary 3D image data such that the simultaneous images of the two image layers (L1, L2) may be combined. At other times, the two image layers (L1, L2) do not contain dependent supplementary 3D image data for each other and thus cannot be combined when e.g. performing de-occlusion. This is indicated by the dependency indicator which is also included in the bitstream and which indicates whether the information in the two image layers correspond to images that represent supplementary, interrelated three dimensional information or whether it indicates that information in the two image layers do not have any correlated three dimensional information. It will be appreciated that the dependency indicator will typically apply equally to the depth layers (D-L1, D-L2) which will also tend to be dependent when the two image layers (L1,L2) are dependent and independent otherwise.

Prior to the cross fade (t<t1) (not shown), the first image layer comprises a foreground image and the second image layer comprises a background image. Similarly, the depth indication maps reflect the foreground and background images and the transparency map corresponds to the foreground. The dependency indicator is set to 0 to reflect that the layers are dependent and interlayer 3D processing is used. Thus, conventional interlayer 3D processing may be used to generate an image corresponding to a different view. E.g. interlayer de-occlusion may be performed.

At time t1, the two image layers are combined to generate a single combined, mixed foreground and background image which is included in the first image layer L1. The depth indication map reflects the depth of the mixed image and is thus a combination of the foreground and background depth indication maps. Thus, at time t1, the 3D data contains only a single layer image and depth, and accordingly the dependency indicator is not relevant (it is thus maintained at a value of 0).

At time t2, an image for the image sequence subsequent to the cross fade is inserted in the second image layer L2 with the corresponding depth map also being included (D-L2). This image is also a combined foreground and background image and the depth indication map is a combined foreground and background depth indication map.

Furthermore, the dependency indicator is set to 1 to reflect that the two images of the first and second image layers are independent. Thus, de-occlusion and other 3D processing for the alternative viewing angle image corresponding to the first image layer is based only on the first image layer and the depth indication map for the first image layer. Furthermore, a uniform transparency value for the entire image is set to full opacity resulting in the rendered image corresponding to the original image of the first image layer.

The transparency value then gradually changes from full opacity to full transparency resulting in the rendered image gradually fading from the original image sequence to the subsequent image sequence.

Specifically, at time T3, the transparency value is midway between full opacity and full transparency and the rendered image is an equal mix between the images of the first and second image layers.

At time t4, the transparency value indicates full transparency resulting in the first image layer no longer being visible and the rendered image corresponding fully to the image sequence following the cross fade.

At time t5, the subsequent image sequence and associated depth indication map moves to the first image layer (corresponding to the foreground image layer) and the transparency value is set to full opacity. Furthermore, at this stage there is only a single image layer and accordingly the depth indication may be set to 0.

The system may then proceed to switch to a two layer representation wherein the image sequence is represented by two image layers and associated depth indication maps.

It will be appreciated that the images of the image layers may for example be static images (e.g. the images illustrated in FIG. 6 may be the same for all times). However, in other examples, the images may represent sequential images, such as e.g. video frames of a video signal.

Figure 7:
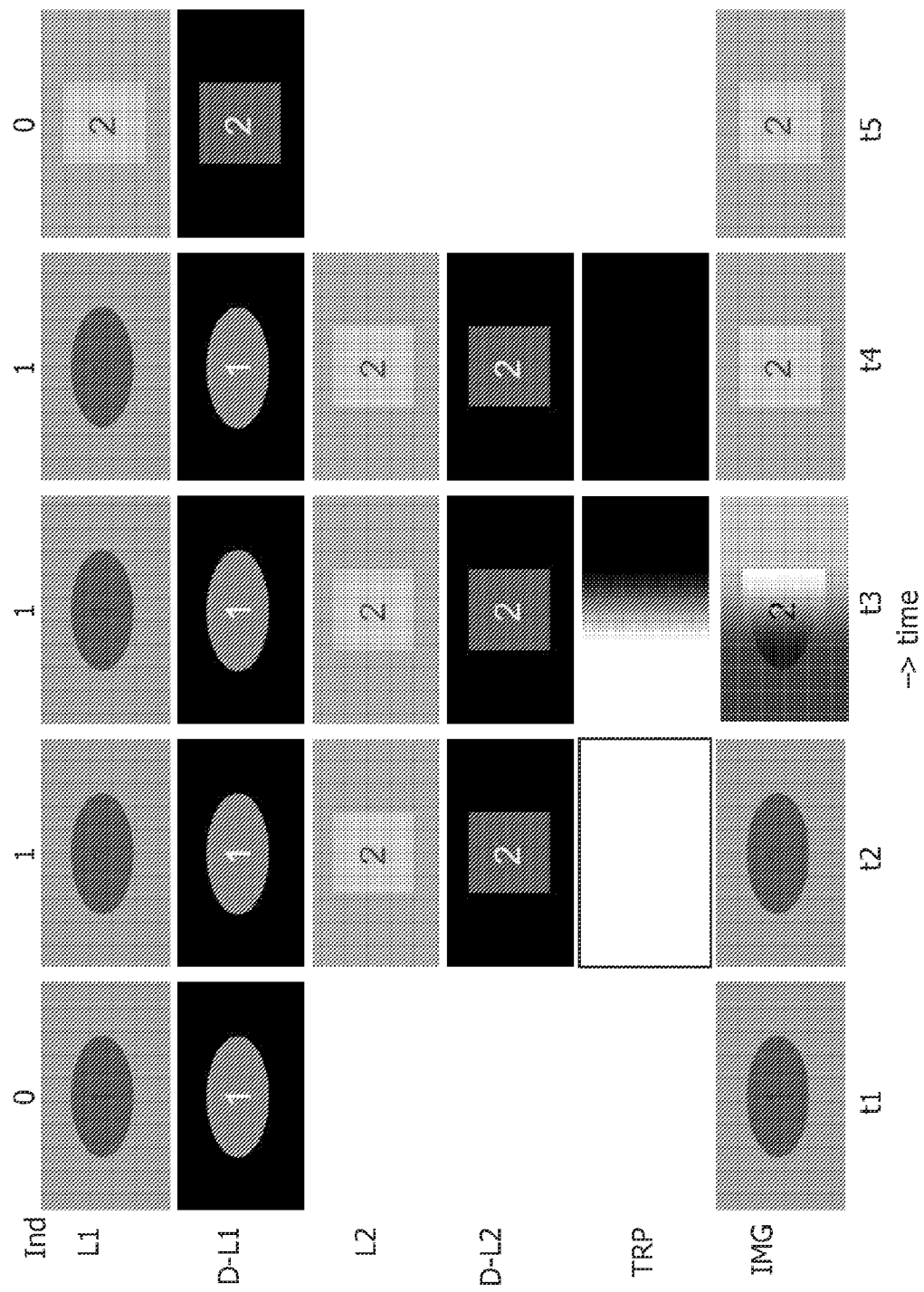
FIG. 7 illustrates an example of a cross fade in accordance with some embodiments of the invention.

It will also be appreciated that the example of FIG. 6 illustrates a very basic cross fade and that more complex cross fades can easily be implemented including various wipes or other transition effects. For example transition effects wherein some image regions show parts of one image, other image regions show parts of another image, and yet other image regions show mixed images can easily be achieved by using a non uniform transparency map. For example, rather than using a transparency map that simply transitions from full opacity to fill transparency, complex and dynamically changing patterns can be used. An example of a cross fade using a wipe transition is illustrated in FIG. 7.

Figure 8:
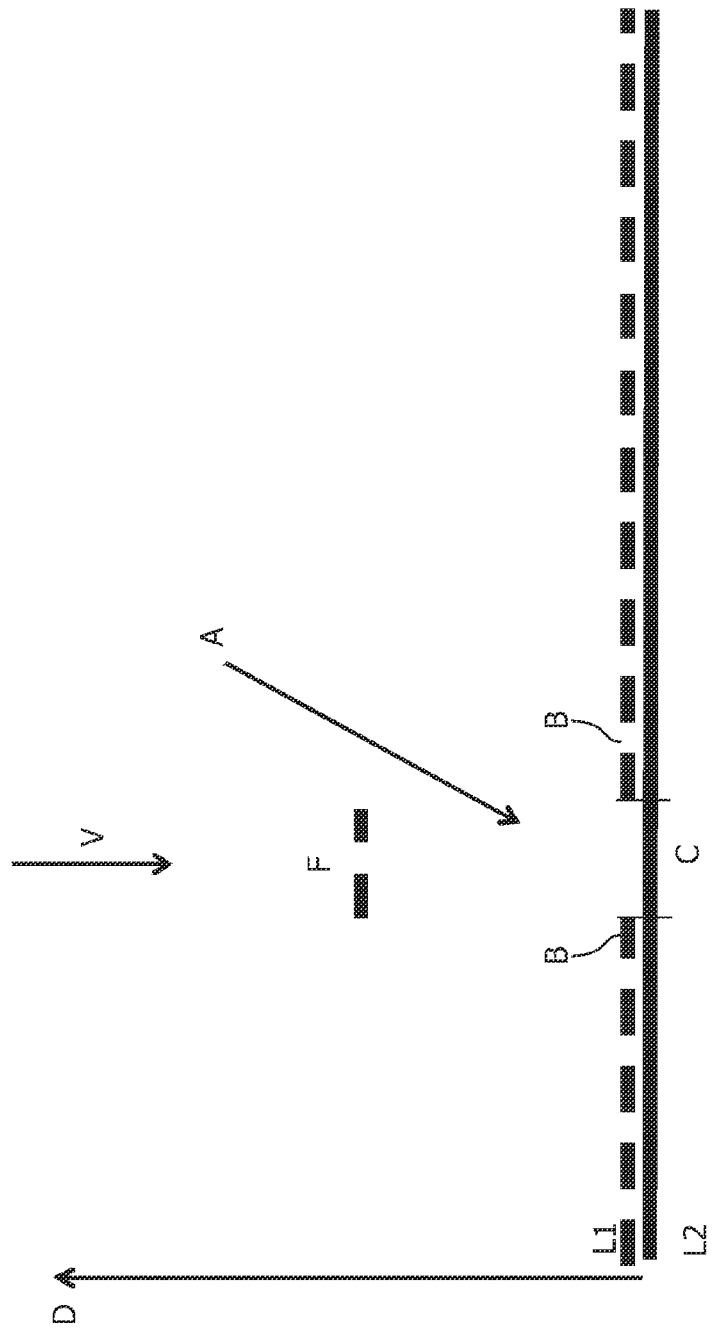
FIG. 8 illustrates an example of rendering of images for different viewing angles.

FIG. 8 illustrates an example of how an image may be processed by the rendering unit 403 depending on the value of the dependence indicator. In the example, the image contents of the first layer L1 is denoted by a dashed line and the image contents of the second layer is indicated by a solid line. In the example, the image of the first layer is a mixed image which contains both elements from a foreground image object F as well as a background. In the situation where the image of L2 is a background image for the image of L1, the image of L2 provides a full background image. In this case, the dependency indicator indicates that L1 and L2 are dependent and that accordingly the image of L2 may be used for e.g. de-occlusion processing.

Accordingly, the rendering unit 403 may generate a first image corresponding to a viewing angle V. In this case, the viewing angle corresponds to that of the images of the layers and as the image of L1 is a mixed image, this can be used directly. Furthermore, a second image may be rendered corresponding to a different viewing angle A. In this case the foreground image F will be displaced in the image and will cover a different part of the background. As a consequence, a part of the background C that was previously occluded by the foreground object F can now be seen. As the two layers are dependent, the rendering unit 403 proceeds to determine the pixel values for the rendered image for viewing angle A using the pixel values for the image area C of the background image provided in L2. Thus, an improved image for viewing angle A is provided.

However, if the image of L2 is not a background layer for the image of L1, this approach will result in the image region being filled in with pixel values that have no relation to the foreground or background images. Accordingly, a visible artifact will be introduced and will result in reduced image quality.

However, in accordance with the current approach, the dependency indicator will in this case indicate that the two layers are independent. This will inform the rendering unit 403 that it may not use the simultaneous image data of L2 to perform de-occlusion for the image of L1. Thus, instead, the rendering unit 403 proceeds to perform de-occlusion for the L1 image based on e.g. the image of L1 (e.g. copying adjacent pixel values or texture from image regions of the background B of L1) or using stored images (e.g. a previous background layer). Thus, the de-occlusion processing may automatically be adapted to reflect the optimal derivation of de-occluded image areas thereby resulting in improved image quality.

Figure 9:
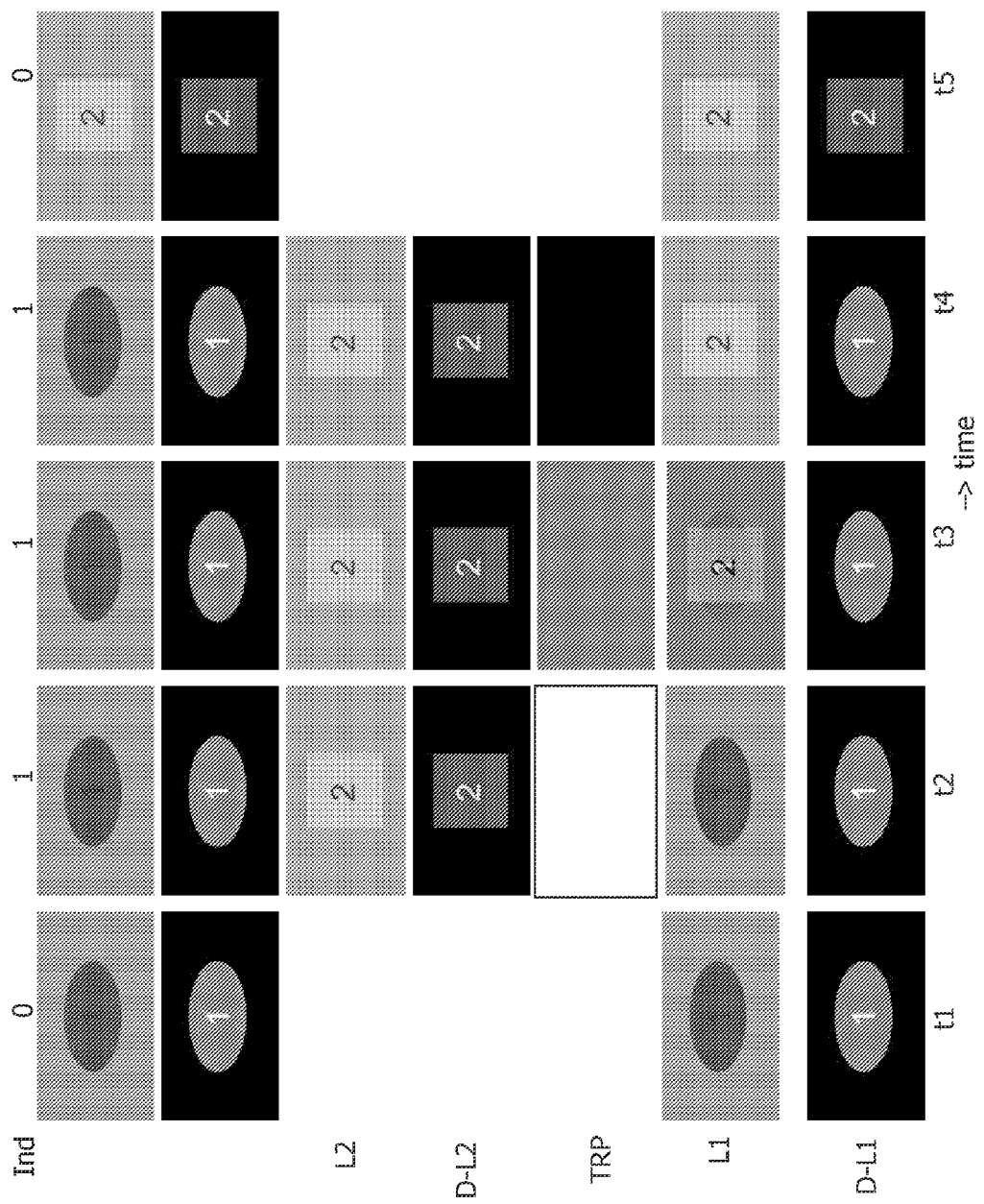
FIG. 9 illustrates an example of a cross fade in accordance with some embodiments of the invention.

It will be appreciated that in some embodiments, at least one of the image layers that are transmitted may comprise images that are themselves a combination of independent images. For example, FIG. 9 illustrates an example that corresponds directly to that of FIG. 6. However, in this example, different layers are included in the generated 3D data that is distributed to rendering devices. In the example, the first image layer L1 corresponds to the combined/composite image including contributions from both the images prior to the cross fade as well as images subsequent to the cross fade (and to mixed images of foreground and background outside of the cross fade). In this case, the first image layer, e.g. at t3, itself contains a composite image that comprises contributions from images that are independent of each other (i.e. the images from before and after the cross fade). Furthermore, in the example, the second image layer L2 contains an image which is identical to an image that is included in the composite image. However, although this may render the simultaneous images of the first and second image layer correlated, the two layers do not, during the cross fade, contain three dimensional image data that complements and supplements each other (rather the image of L2 is identical to the faded image included in the composite image of L1). Specifically, the image in one image layer does not include any image data for a complementary image plane of an image plane represented by the image data of the other image layer.

In the example, the first depth layer D-L1 furthermore comprises a composite depth layer that provides depth information for the composite image of L1. Furthermore, in the example, the foreground image and associated depth map (the two top rows of FIG. 9) are not themselves included in the 3D data but are only used to generate the data for the composite layers L1 and D-L1.

In addition, a transparency layer is generated which reflects the transparency of the foreground image relative to the image of L2. Thus, this transparency map provides an indication of the relative contribution of the pre-cross fade image and the post-cross fade image to the composite image of L1.

The dependency indicator is generated in the same way as before, i.e. to indicate whether or not the image layers contain supplementary 3D data that corresponds to different image planes and which thus can be used to perform e.g. de-occlusion.

Thus, in the specific example of FIG. 9, 3D signaling data may be generated which comprises:

a first image layer comprising image data that at least for some images represents a composite image comprising a contribution from a plurality of images;

a first depth layer comprising a composite depth map for the composite image;

a second image layer comprising image data for a further image contributing to the composite image;

a second depth layer comprising a further depth map for the further image; and a transparency map representing a contribution of the further image to the composite image.

In addition, the dependency indicator is included reflecting whether an image of the second image layer comprises at least one of a foreground image and a background image for at least one image contributing to a composite image of the first image layer or whether the image of the second image layer is not one of a foreground image and a background image of any image contributing to the composite image.

The described approach may provide the advantage that the image of the first image layer L1 may be directly used in a conventional rendering unit. Thus, by simply using the image of L1, an image is provided which includes the cross fade and combining of the different images. However, at the same time, the operation of a rendering unit which is able to exploit all the provided data may be improved. Thus, the rendering unit 403 may e.g. recreate the original mixed image (of the first row of FIG. 9) based on the composite image and the transparency information. It may then proceed to perform de-occlusion of this image depending on the value of the dependency indicator. Thus, if the dependency indicator reflects that L2 provides background data for the derived image, the information is used for de-occlusion and otherwise the current image of L2 is ignored for this purpose.

In the described examples, interlayer processing is accordingly only applied when the dependency indicator is indicative of the layers being dependent and is not applied when the dependency is indicative of the layers being independent. It will be appreciated that in other embodiments, the dependency indicator need not be a binary value. For example, it may be a parameter that can take a number of discrete values where each value corresponds to a set of processing algorithms that may be applied for this dependency.

In the specific example, the interlayer 3D image processing is switched on and off depending on the value of the dependency indicator and specifically an interlayer de-occlusion process is switched on and off (corresponding to the de-occlusion processing being adapted to be either single layer or interlayer processing). However, in other embodiments, the interlayer 3D processing may be adapted in response to the dependency indicator. For example, in some embodiments, the determination of displacement in the different image views may be switched between interlayer processing and single layer processing depending on the dependency indicator.

In some embodiments, the dependency indicator may indicate whether the depth indication map of the images in the first and second image layers are consistent or are inconsistent. Specifically, when the first and second image layers comprise respectively a foreground (or mixed) image and a background image, the depth indication map for the background image (i.e. for the second image layer) will always represent a deeper (or the same) position than the corresponding pixel for the depth indication map for the foreground image. However, in scenarios where the two image layers do not comprise corresponding foreground and background images but rather comprise independent images, such as during a cross fade, this relationship between the depth indication maps may break down. In this case, the depth indication values for the first image layer may in some image regions be lower than the corresponding depth indication values for the second image layer and may in other regions be higher than the corresponding depth indication values for the second image layer.

Accordingly, the dependency indicator may be set to reflect whether the depth indication maps are consistent or inconsistent with each other. Indeed, in some embodiments this criterion may be used to determine a value of the dependency indicator.

The previous description has focused on examples wherein the 3D data comprises two image layers. However, in other embodiments more than two image layers may be used. In such embodiments, the dependency indicator may for example provide an indication of the dependency between all possible image layer pairs.

In some embodiments, the image layers may be dynamically or statically divided into image layer groups where each image layer group comprises one or more dependent image layers. For example, one image layer group may contain two image layers that contain dependent image layers. Another image layer group may also contain two image layers that are dependent. However, the dependency between the image layer groups may vary and the current dependency between the image layer groups may be indicated by the dependency indicator. For example, a 3D image representation may comprise four different image layers that can be combined to provide images for 3D perception. However, during a cross fade, the representation may be reduced to a two layer representation for both the image prior to the cross fade and the image following the cross fade. Following the cross fade, the representation is again increased to a four layer representation. Thus, before and after the cross fade, the 3D processing may use all four layers. However, during the cross fade, two image layer groups of each two image layers comprise independent images. Accordingly, during the cross fade, the 3D processing of each image is reduced to a two layer processing. In such an example, the dependency indicator may indicate whether the image groups are dependent or not, and the 3D processing may be adapted in response to this. As another example, a two layer video representation may be used before and after a cross fade with a four layer signal comprising two two-layer video representations being used during the cross fade. The dependency indicator can then indicate the dependency within each 2-layer video, but the independency between the two videos during the cross-fade.

Thus, for more layers the dependency indicator may be a group based indicator. Furthermore, in some embodiments, the 3D data may be structured in accordance with the image layer groups. For example, image layers within each group may be arranged such that they are adjacent. E.g., the data combiner 215 may be arranged to order data for image layers such that image layers that belong to the same image layer group are adjacent. In such embodiments, the dependency indicator may simply indicate a location in the 3D data of the next independent image layer group.

For example, a 3D data stream may comprise six image layers numbered as image layers 1-6. In some scenarios all layers may be dependent and this may be reflected by the dependency indicator being set to zero. In other scenarios, the image layers may be divided into two independent image layer groups each of which contain three image layers. The first image layer group will use layers 1-3 and the second image layer group will use layers 4-6. This may be indicated by simply setting the dependency indicator to a value of 4. In other scenarios, the image layers may be divided into three independent image layer groups (comprising image layers 1-2, 3-4 and 5-6 respectively). This may be communicated by setting the dependency indicator to a value of (3.5).

Thus, a highly efficient representation of the dependency information can be achieved resulting in a low signalling overhead.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of generating a three dimensional image data stream comprising a plurality of image layers for use in rendering picture elements of views of a three dimensional image, the method comprising:

providing first image data for a first image layer;
providing second image data for a second image layer;
providing depth indication data for at least one of the first image layer and the second image layer;
generating a dependency indicator, the dependency indicator being indicative of whether a first image of the first image layer contains supplementary three dimensional layered image data for a second simultaneous image of the second image layer; and
generating the three dimensional image data stream by combining the first image data, the second image data, the depth indication data and the dependency indicator.

2. The method of claim 1 wherein the dependency indicator is indicative of the first image layer and the second image layer being dependent when the first image layer is an occlusion layer for the second image.

3. The method of claim 2 wherein the dependency indicator is indicative of the first image layer and the second image layer being independent when the first image layer is not an occlusion layer for the second image.

4. The method of claim 1 wherein the depth indication data comprises a first depth indication map for the first image layer and a second depth indication map for the second image layer; and wherein the dependency indicator is indicative of the first image layer and the second image layer being independent when depth indication values of the first depth indication map are inconsistent with depth indication values of the second depth indication map.

5. The method of claim 4 wherein the depth indication values of the first depth indication map are inconsistent with the depth indication values of the second depth indication map if the depth indication values of the first depth indication map represent deeper depth levels than depth indication values of the second indication map in at least one image region and the depth indication values of the second depth indication map represent deeper depth levels than the depth indication values of the first indication map in at least one other image region.

6. The method of claim 1 wherein the dependency indicator is indicative of the first image layer and the second image layer being independent when the first image layer and the second image layer comprises cross fade images, and is indicative of the first image layer and the second image layer being dependent when the first image layer and the second image layer do not comprise cross fade images.

7. The method of claim 1 wherein the dependency indicator is a binary data value having a first value indicating that the first image layer and the second image layer are dependent and a second value indicating that the first image layer and the second image layer are independent.

8. The method of claim 7 wherein the dependency indicator is set to the first value if the first image layer comprises a foreground image for an image of the second image layer and to the second value if the first image layer does not comprise a foreground image for the image of the second image layer.

9. The method of claim 1 wherein the first image layer belongs to a first image layer group and the second image layer belongs to a second image layer group, at least one of the first image layer group and the second image layer group comprising a plurality of image layers; and the dependency indicator is indicative of a dependency between image layers of the first image layer group and image layers of the second image layer group.

10. The method of claim 9 wherein image layers of an image layer group are dependent image layers.

11. The method of claim 9 wherein image data for image layers in an image layer group are of adjacent layers and the dependency indicator is indicative of a layer location in the three dimensional image data steam of a next independent image layer group.

12. The method of claim 1 further comprising providing transparency data for at least one of the first image layer and the second image layer and including the transparency data in the three dimensional image data stream.

13. A method of rendering image elements comprising:
receiving a three dimensional image data stream comprising first image data for a first image layer, second image data for a second image layer, depth indication data for at least one of the first image layer and the second image layer, and a dependency indicator indicative of a dependency between the first image layer and the second image layer; and
rendering image elements of multiple views of the three dimensional image data stream for use in visualizing a three dimensional image by processing the first image data, the second image data and the depth indication data in response to the dependency indicator.

14. The method of claim 13 wherein the rendering comprises performing interlayer three dimensional image processing of simultaneous images of the first image layer and the second image layer only when the dependency indicator is indicative of the first image layer and the second image layer being dependent.

15. The method of claim 13 wherein the rendering comprises performing de-occlusion for a first image of the first image layer using information from a second image of the second image layer only if the dependency indicator is indicative of the first image layer and the second image layer being dependent.

16. The method of claim 13 wherein the rendering comprises combining a first image of the first image layer and a second image of the second image layer, the combination being in response to three dimensional image information when the dependency indicator is indicative of the first image layer and the second image layer being dependent and not being in response to three dimensional image information when the dependency indicator is indicative of the first image layer and the second image layer being independent.

17. An apparatus for generating a three dimensional image data stream comprising a plurality of image layers for use in rendering picture elements of views of a three dimensional image, the apparatus comprising:
a first image layer processor configured to provide first image data for a first image layer;
a second image layer processor configured to provide second image data for a second image layer;
a depth map processor configured to provide depth indication data for at least one of the first image layer and the second image layer;
a dependency processor configured to generate a dependency indicator indicative of a dependency between the first image layer and the second image layer; and
a data combiner configured to generate the three dimensional image data stream by combining the first image data, the second image data, the depth indication data and the dependency indicator.

18. An apparatus for rendering image elements, the apparatus comprising:
a receiver configure to receive a three dimensional image data stream comprising first image data for a first image layer, second image data for a second image layer, depth indication data for at least one of the first image layer and the second image layer, and a dependency indicator indicative of a dependency between the first image layer and the second image layer; and a rendering unit configured to render image elements of multiple views of the three dimensional image data stream for use in visualizing a three dimensional image by processing the first image data, the second image data and the depth indication data in response to the dependency indicator.

19. A method of generating a three dimensional image data stream comprising a plurality of image layers for use in rendering picture elements of views of a three dimensional image, the method comprising:

providing a first image layer comprising image data that at least for some images represents a composite image comprising a contribution from a plurality of images;

providing a first depth layer comprising a composite depth map for the composite image;

providing a second image layer comprising image data for a further image contributing to the composite image;

providing a second depth layer comprising a further depth map for the further image;

providing a transparency map representing a contribution of the further image to the composite image;

generating a dependency indicator reflecting whether an image of the second image layer comprises at least one of a foreground image and a background image for at least one image contributing to a composite image of the first image layer or whether the image of the second image layer is not one of a foreground image and a background image of any image contributing to the composite image; and generating the three dimensional image data stream by combining the first image layer, the first depth layer, the second image layer, the second depth layer, the transparency map and the dependency indicator.

20. A method of rendering image elements comprising:

receiving a three dimensional image data stream comprising a first image layer comprising image data that at least for some images represents a composite image comprising a contribution from a plurality of images;

a first depth layer comprising a composite depth map for the composite image;

a second image layer comprising image data for a further image contributing to the composite image;

a second depth layer comprising a further depth map for the further image;

a transparency map representing a contribution of the further image to the composite image;

a dependency indicator reflecting whether an image of the second image layer comprises at least one of a foreground image and a background image for at least one image contributing to a composite image of the first image layer or whether the image of the second image layer is not one of a foreground image and a background image of any image contributing to the composite image; and rendering image elements of multiple views of the three dimensional image data stream for use in visualizing a three dimensional image by three dimensional processing of the three dimensional image data stream wherein de-occlusion for an image of the first image layer is in response to a simultaneous image of the second image layer only if the dependency indicator is indicative of the image of the second image layer being at least one of a background image and a foreground image of an image contributing to the image of the first image layer.

* * * * *